United States Patent
Curtis et al.

(10) Patent No.: US 6,859,983 B2
(45) Date of Patent: Mar. 1, 2005

(54) CAMOUFLAGE MATERIAL (75) Inventors: Charles Curtis, Benson, NC (US); Samuel K. Black, Raleigh, NC (US)

(73) Assignee: Polymer Group, Inc., North Charleston, SC (US)

( * ) Notice: Subject to any disclaimer, the term of this patent is extended or adjusted under 35 U.S.C. 154(b) by 128 days.

(21) Appl. No.: 10/246,200

(22) Filed: Sep. 18, 2002

(65) Prior Publication Data

US 2003/0092341 A1 May 15, 2003

Related U.S. Application Data (60) Provisional application No. 60/323,590, filed on Sep. 20, 2001.

(51) Int. Cl.[7] ............................ D04H 1/46; D04H 13/00
(52) U.S. Cl. .............................. 28/104; 28/163; 28/169
(58) Field of Search .......................... 28/140, 143, 153, 28/158, 166, 103, 104, 105, 106, 107, 109, 163, 165, 167, 169; 26/1, 69 R; 428/15–18, 919, 24–46; 156/148; 101/138, 211, 150, 170, 483, 490, 493, 494; 442/408

(56) References Cited

U.S. PATENT DOCUMENTS

| | | | |
|---|---|---|---|
| 3,485,706 A | | 12/1969 | Evans |
| 3,750,237 A | * | 8/1973 | Kalwaites ..................... 28/105 |
| 3,849,223 A | * | 11/1974 | Kent ........................ 156/148 |
| 4,001,827 A | | 1/1977 | Wallin et al. |
| 4,144,366 A | * | 3/1979 | Lewis ......................... 428/88 |
| 4,145,468 A | * | 3/1979 | Mizoguchi et al. .......... 442/269 |
| 4,211,593 A | * | 7/1980 | Lochner ..................... 156/148 |
| 4,519,804 A | * | 5/1985 | Kato et al. ..................... 8/485 |
| 4,656,065 A | | 4/1987 | Yacovella |
| 4,931,320 A | | 6/1990 | Leonard |
| 5,013,375 A | | 5/1991 | Leonard |
| 5,098,764 A | | 3/1992 | Drelich et al. |
| 5,244,711 A | | 9/1993 | Drelich et al. |
| 5,405,650 A | * | 4/1995 | Boulanger et al. .......... 427/261 |
| 5,476,561 A | | 12/1995 | Bylund et al. |
| 5,486,385 A | | 1/1996 | Bylund et al. |
| 5,532,052 A | * | 7/1996 | Eng et al. ................... 442/314 |
| 5,652,963 A | | 8/1997 | Davison |
| 5,822,823 A | | 10/1998 | Polzin et al. |
| 5,827,597 A | | 10/1998 | James et al. |
| 6,092,857 A | | 7/2000 | Rivas |
| 6,209,244 B1 | * | 4/2001 | Chenel ........................ 40/584 |
| 6,256,922 B1 | | 7/2001 | Jones et al. |
| 6,487,762 B1 | * | 12/2002 | Fleissner ..................... 28/104 |
| 6,561,100 B1 | * | 5/2003 | Buse et al. ................. 101/487 |
| 6,671,936 B1 | * | 1/2004 | Carlson et al. ............... 28/104 |
| 6,751,831 B2 | * | 6/2004 | Willauer et al. ............. 28/167 |
| 2001/0000735 A1 | * | 5/2001 | Weder ......................... 428/17 |
| 2001/0001753 A1 | * | 5/2001 | Nelson et al. ............. 442/131 |
| 2003/0096546 A1 | * | 5/2003 | Strength et al. ............ 442/131 |

* cited by examiner

Primary Examiner—A. Vanatta
(74) Attorney, Agent, or Firm—Wood, Phillips, Katz, Clark & Mortimer (57) ABSTRACT

In the present invention, a hydroentangled and three-dimensionally patterned fibrous material is printed or dyed with suitable coloring agents that are beneficial in enhancing the ability of the material to disrupt or obscure objects placed beneath such material. A three-dimensional pattern in the fibrous material results in a camouflage fabric with enhanced realism due to ability of the fabric to transmit varying amounts of direct and incidental light, thus producing shape-obscuring shadows.

5 Claims, 8 Drawing Sheets

CAMOUFLAGE MATERIAL

TECHNICAL FIELD

The present invention relates generally to a nonwoven fabric, and specifically, to a nonwoven fabric having imparted therein natural or organic textured regions, whereby the nonwoven fabric is further subjected to the application of color in the patterned regions of the face fabric to prepare a material having an enhanced camouflage performance.

BACKGROUND OF THE INVENTION

Camouflage materials are routinely used in hunting and military applications whereby there is a desire to obscure an object from immediate recognition. To fabricate such camouflage materials, conventional textile fabrics, such as cotton-duck, have been practiced and simply printed with a two-dimensional pattern.

The production of conventional textile fabrics is known to be a complex, multi-step process. The production of fabrics from staple fibers begins with the carding process where the fibers are opened and aligned into a feedstock known as sliver. Several strands of sliver are then drawn multiple times on drawing frames to further align the fibers, blend, improve uniformity as well as reduce the diameter of the sliver. The drawn sliver is then fed into a roving frame to produce roving by further reducing its diameter as well as imparting a slight false twist. The roving is then fed into the spinning frame where it is spun into yarn. The yarns are next placed onto a winder where they are transferred into larger packages. The yarn is then ready to be used to create a fabric.

For a woven fabric, the yarns are designated for specific use as warp or fill yarns. The fill yarn packages (which run in the cross direction and are known as picks) are taken straight to the loom for weaving. The warp yarns (which run on in the machine direction and are known as ends) must be further processed. The packages of warp yarns are used to build a warp beam. Here the packages are placed onto a warper, which feeds multiple yarn ends onto the beam in a parallel array. The warp beam yarns are then run through a slasher where a water-soluble sizing is applied to the yarns to stiffen them and improve abrasion resistance during the remainder of the weaving or knitting process. The yarns are wound onto a loom beam as they exit the slasher, which is then mounted onto the back of the loom. Here the warp and fill yarns are interwoven or knitted in a complex process to produce yardages of cloth.

Coloring and shading are likewise complex processes in conventional textile production. Colors and patterns of color can be achieved by using yarns of various colors, resulting from the dyeing of the yarn packages themselves. Further, greige goods, yardage produced from undyed yarns, can be dyed in any of several ways common to the industry, such as jet dyeing, and vat dyeing. For application of color and patterns of colors onto the surface of a fabric, screen-printing is commonly used, whereby pigments are applied to the fabrics by a series of engraved rolls where each roll applies a specific color and part of the pattern.

Detailed shading of colors, where more than one hue of a particular major color are apparent in the same fabric, is usually achieved with a yarn that has a blend of fibers, where each of the fibers takes up the color differently in the dyeing process. An example of such a yarn is heather yarns, popular for knitting sweaters.

In contrast, the production of nonwoven fabrics from staple fibers is known to be more efficient than traditional textile processes as the fabrics are produced directly from the carding process. Nonwoven fabrics are suitable for use in a wide variety of applications where the efficiency with which the fabrics can be manufactured provides a significant economic advantage for these fabrics versus traditional textiles. Hydroentangled fabrics have been developed with improved properties that are a result of the entanglement of the fibers or filaments in the fabric providing improved fabric integrity. U.S. Pat. No. 3,485,706, to Evans, hereby incorporated by reference, discloses processes for effecting hydroentanglement of nonwoven fabrics. More recently, hydroentanglement techniques have been developed which impart images or patterns to the entangled fabric by effecting hydroentanglement on three-dimensional image transfer devices. Such three-dimensional image transfer devices are disclosed in U.S. Pat. No. 5,098,764, hereby incorporated by reference, with the use of such image transfer devices being desirable for providing a fabric with enhanced physical properties.

A particularly advantageous application of this patterning technology is the ability to form nonwoven fabrics having a natural or organic texture imparted into the actual fabric at the time of manufacture. Image transfer devices can be utilized which can impart an irregular three-dimensional pattern, which aids in distracting the human eye away from the planar quality of the material. The imparted three-dimensional texture also provides for the ability of the material to cast variable shadows, thus further enhancing the disruptive power of the material. A fabric having such a natural or organics texture in an irregular pattern can be further enhanced in a camouflage application by the use of pre-dyed fibrous components and/or post fabrication dying and printing.

SUMMARY OF THE INVENTION

In the present invention, a hydroentangled and three-dimensionally patterned fibrous material is printed or dyed with suitable coloring agents that are beneficial in enhancing the ability of the material to disrupt or obscure objects placed beneath such material. A three-dimensional pattern in the fibrous material results in a camouflage fabric with enhanced realism due to ability of the fabric to transmit varying amounts of direct and incidental light, thus producing shape-obscuring shadows. The three-dimensional pattern is formed by the use of an image transfer device, said device having various woodland and/or grassland patterns, including, but not limited to; tree bark, leaves, pine boughs, tree limbs, flowers, grass blades, pine cones, palm fronds, and rocks. The coloring agents may be one of several types of materials able to provide a suitable color transfer, such as by dyeing, including differential dyeing, transfer printing, digital printing, and application of other colored substrates.

A method of making a variably colored, nonwoven based composite material embodying the principles of the present invention contemplates the use of staple length fibers to facilitate economical fabric formation. Formation of the fibrous nonwoven fabric on a three-dimensional, image transfer device by hydroentangling imparts desired physical properties to the fabric such as the controlled placement of the fiber population relative to the desired three-dimensional pattern imparted by the imaging device. This nonwoven fabric may be white or colored. The addition of colored facing materials, such materials having earth tones, regional foliage, grays and blacks colors and patterns, results in a variable appearance of the color compounded by the three-dimensional nature of the hydroentangled, patterned nonwoven fabric. In this manner, the overall disruptive pattern is enhanced by the creation of shadows and variations in color intensity and hue in selected regions of the pattern.

A method of making a nonwoven fabric in accordance with the present invention includes providing a precursor web comprising staple length fibers, continuous filaments or blends of staple length fibers and continuous filaments. Fibers or filaments can comprise thermoplastic, thermoset, or natural fiber compositions.

The performance of the nonwoven fabric can be altered by incorporating blends of fibers, including binder fibers, and application of liquid binders or performance altering chemistries. Binder fibers, or fusible fibers, are particular preferred to improve the tear and abrasion resistance of the nonwoven fabric. Radiation absorbing fibers can also be in incorporated for obscuring a covered object from detection outside the visible spectrum. Suitable radiation absorbing fibers include such materials as metallic filaments, chaff, carbon-doped fibers, and thermo-responsive or thermo-chromic fibers. Other performance altering chemistries include hydrophilic agents and de-lusterants. Suitable mechanism of forming such precursor webs includes: carded fibrous batt, air-laid fiber web, spun-laid filament web, melt-blown filament web, consolidated non-woven fabric, and combinations thereof. A preferable method of forming a suitable precursor web is through the pre-entanglement of staple fibers on a foraminous forming surface through the use of high-pressure water jets.

The present method further entails the provision of a three-dimensional, image transfer device having an array of three-dimensional surface elements thereon. The precursor web is positioned on the image transfer device, and hydroentangled to form an imaged nonwoven fabric.

The present invention further contemplates the addition of a colored facing material to the patterned nonwoven fabric by means known in the art. Suitable facing materials include fibrous webs, films and foams. These materials are colored by any means known in the art, such as screen-printing, the use of chemical dyes or the use of colored substrates such as the extrusion of a film or foam containing pigments or a separate layer of fibrous material.

DETAILED DESCRIPTION

While the present invention is susceptible of embodiment in various forms, there is shown in the drawings, and will hereinafter be described, a presently preferred embodiment of the invention, with the understanding that the present disclosure is to be considered as an exemplification of the invention, and is not intended to limit the invention to the specific embodiment illustrated.

In an attempt to improve on camouflage performance, increasingly complex measures have been taken in the fabrication of such materials. U.S. Pat. Nos. 4,931,320 and 5,013,375 to Leonard and U.S. Pat. Nos. 5,476,561 and 5,486,385 to Bylund describe over-sewn die-cut fabrics or films attached to a mesh substrate. These materials exhibit improved performance at the apparent cost of complexity, durability, and bulk.

The present invention is directed to a method of forming camouflage materials based on nonwoven fabrics, such nonwoven fabrics being produced by hydroentanglement, wherein imaging and patterning of the fabrics is enhanced by hydroentanglement on a three-dimensional image transfer device. Such imaged hydroentangled fabrics are then treated with colored facing materials, such as printed dyes, other nonwoven fabrics, films or foams, to produce a camouflage fabric. The imaging process creates a three-dimensional nonwoven fabric whereby regions of the pattern impart a variety of hues of coloration within the pattern of the facing layer.

A method of making a nonwoven fabric in accordance with the present invention includes providing a precursor web comprising staple length fibers, continuous filaments or blends of staple length fibers and continuous filaments. Fibers or filaments can comprise thermoplastic, thermoset, or natural fiber compositions.

The performance of the nonwoven fabric can be altered by incorporating blends of fibers, including binder fibers, and application of liquid binders or performance altering chemistries. Binder fibers, or fusible fibers, are particular preferred to improve the tear and abrasion resistance of the nonwoven fabric. Radiation absorbing compounds, as described in U.S. Pat. No. 4,001,827 to Wallin et al., hereby incorporated by reference, can also be in integrated into the material for obscuring a covered object from detection by means outside the visible spectrum. Suitable radiation absorbing fibers include such materials as metallic filaments, chaff, carbon-doped fibers, and thermo-responsive or thermo-chromic fibers. Other performance altering chemistries include hydrophilic agents and de-lusterants.

Figure 1:
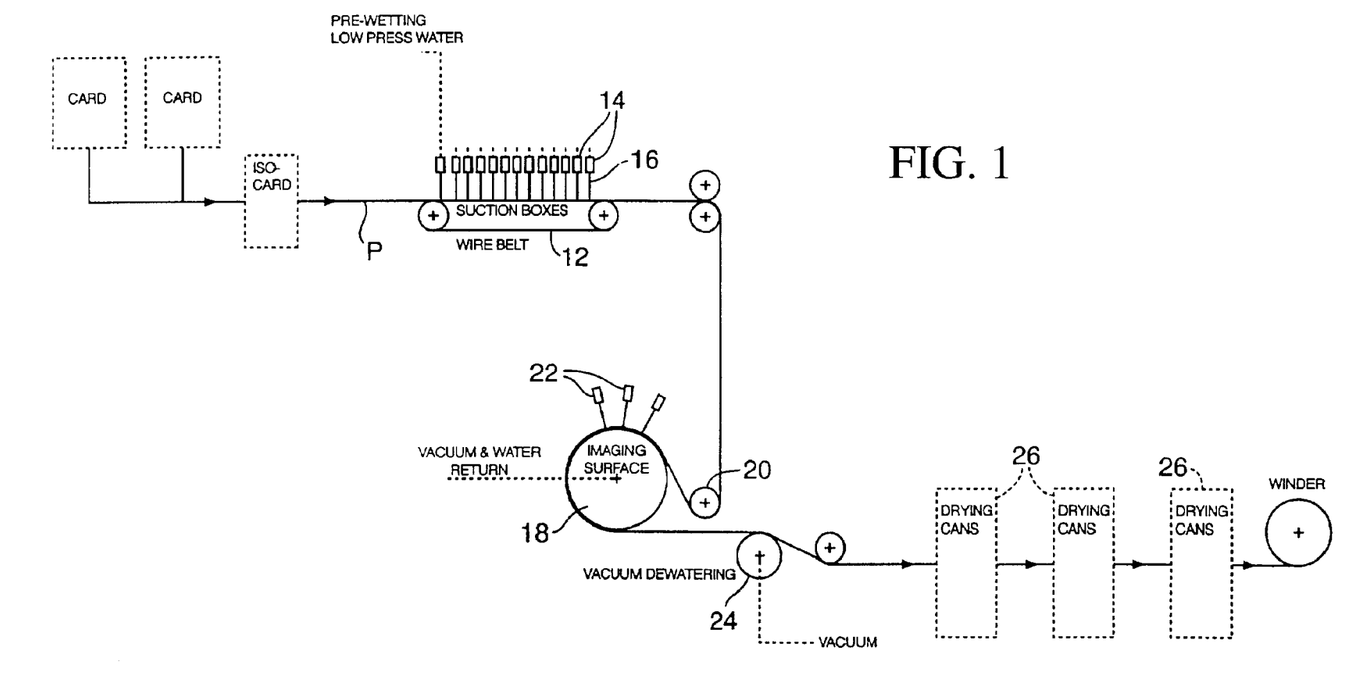
FIG. 1 is a diagrammatic view of an apparatus for manufacturing a nonwoven facing fabric embodying the principles of the present invention, and includes a schematic of the process steps for the manufacture of the colored composite.

With particular reference to FIG. 1, therein is illustrated an apparatus for practicing the method of the present invention for forming a nonwoven fabric. The fabric is formed from a fibrous matrix, which comprises fibers selected to promote economical manufacture. The fibrous matrix is preferably carded and subsequently aid-randomized to form a precursor web, designated P.

FIG. 1 illustrates a hydroentangling apparatus for forming nonwoven fabrics in accordance with the present invention. The apparatus includes a foraminous-forming surface in the form of a flat bed entangler 12 upon which the precursor web P is positioned for pre-entangling. Precursor web P is then sequentially passed under entangling manifolds 14, whereby the precursor web is subjected to high-pressure water jets 16. This process is well known to those skilled in the art and is generally taught by U.S. Pat. No. 3,485,706, to Evans, hereby incorporated by reference.

The entangling apparatus of FIG. 1 further includes an imaging and patterning drum 18 comprising a three-dimensional image transfer device for effecting imaging and patterning of the now-entangled precursor web. After pre-entangling, the precursor web is trained over a guide roller 20 and directed to the image transfer device 18, where a three-dimensional image is imparted into the fabric on the foraminous-forming surface of the device. The web of fibers is juxtaposed to the image transfer device 18, and high pressure water from manifolds 22 is directed against the outwardly facing surface from jet spaced radially outwardly of the image transfer device 18. The image transfer device 18, and manifolds 22, may be formed and operated in accordance with the teachings of commonly assigned U.S. Pat. Nos. 4,098,764, 5,244,711, 5,822,823, and 5,827,597, the disclosures of which are hereby incorporated by reference. It is presently preferred that the precursor web P be given a three-dimensional image suitable to provide fluid management, as will be further described, to promote use of the present nonwoven fabric in disposable absorbent articles. The entangled fabric can be vacuum dewatered at 24, and dries at an elevated temperature on drying cans 26.

Hydroentanglement results in portions of the precursor web being displaced from on top of the three-dimensional surface elements of the imaging surface to form an imaged and patterned nonwoven fabric. Following the imaging station in FIG. 1, the imaged nonwoven layer is printed by any commonly known practice. In an alternate process of the invention, the imaged nonwoven fabric is wound into a roll and transferred to a separate practicable printing means.

EXAMPLES

Example 1

Figure 2:
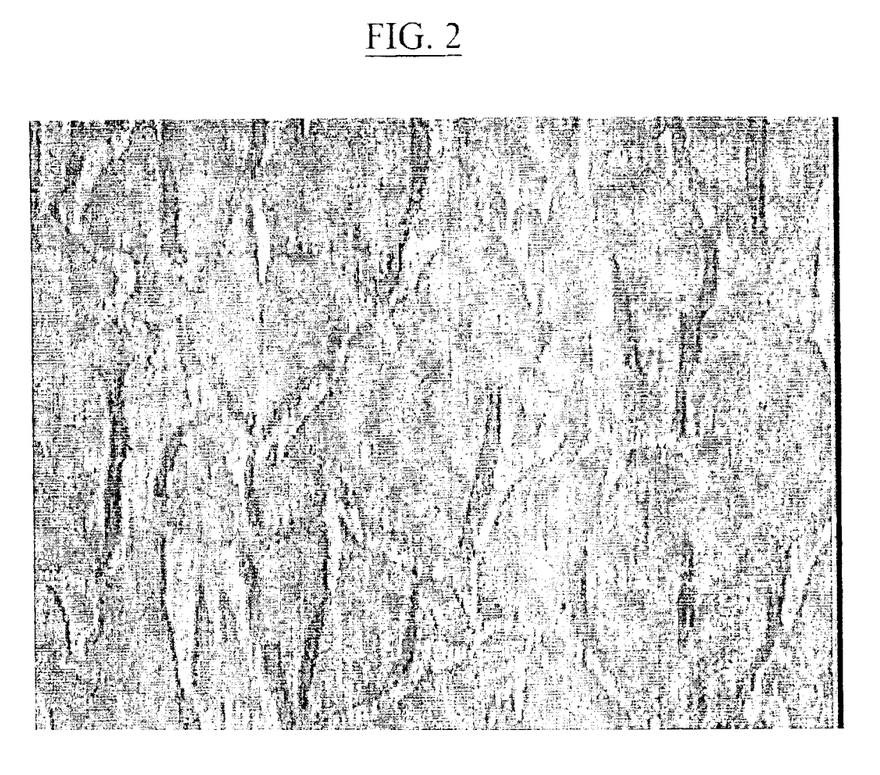
FIG. 2 is a photograph of an exemplary imaged nonwoven substrate having an "ivy" image.

A nonwoven fabric was manufactured utilizing the above-described mechanism. The nonwoven fabric comprised a fibrous prebond comprising a blend of 90% by weight polyester fiber as supplied by Wellinan under Type 472, and 10% by weight polyester binder staple fiber as supplied by Kosa under Type 252, was formed on a flat bed entangler with five entangling manifolds 14 at 90, 40, 50, 70, and 80 bar, respectively. The prebond was then run on an image transfer device 18 having an "ivy" pattern as shown in the resulting fabric in FIG. 2. Three imaging manifolds were operated at approximately 100 bar each. The material was then dried on two elevated temperature steam cans.

Example 2

Figure 3:
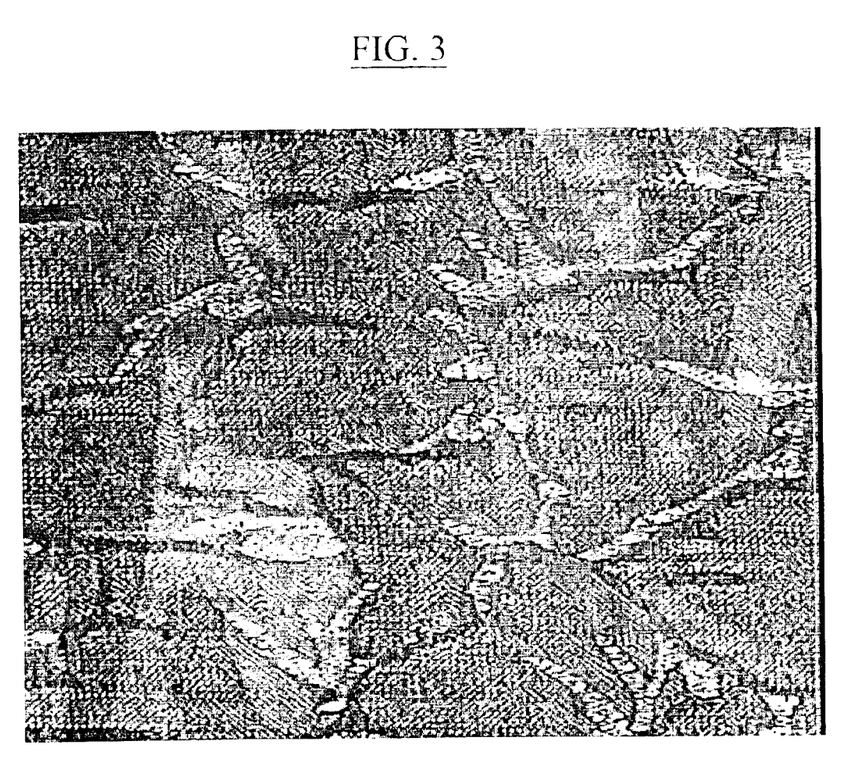
FIG. 3 is a photograph of an exemplary imaged nonwoven substrate having an "ivy" image and overprinted with a print pattern to enhance the camouflage performance.

A nonwoven fabric as manufactured in Example 1, wherein the material has been overprinted with a North American green camouflage pattern. The completed camouflage material is shown in FIG. 3

Example 3

Figure 4:
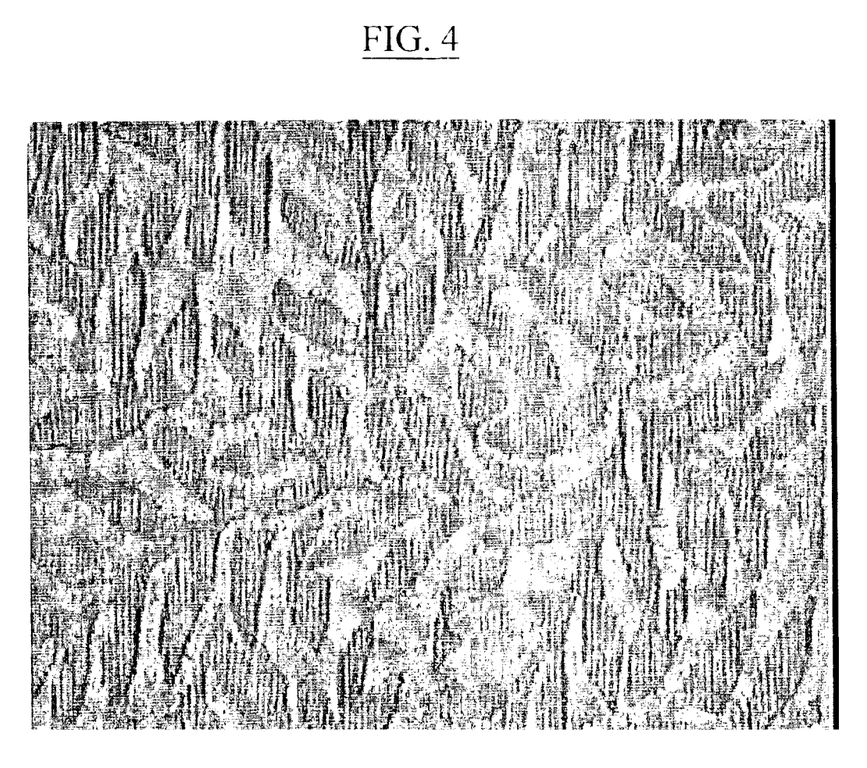
FIG. 4 is a photograph of an exemplary imaged nonwoven substrate having a "macrame" image.

A nonwoven fabric was manufactured as described in Example 1, whereby in the alternative a "macramé" pattern was used on the image transfer device 18, and depicted in the resulting fabric in FIG. 4

Example 4

Figure 5:
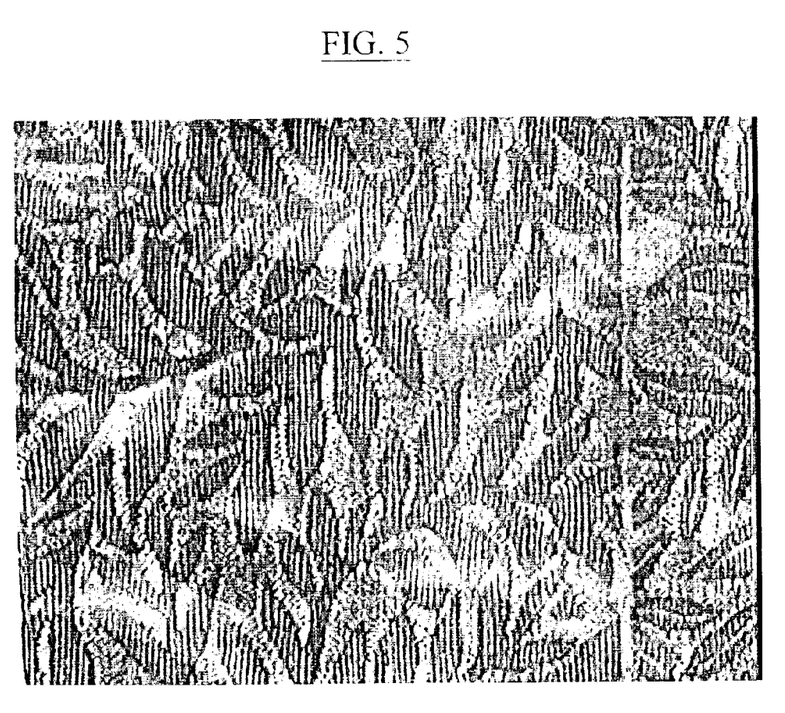
FIG. 5 is a photograph of an exemplary imaged nonwoven substrate having a "macramé" image and overprinted with a print pattern to enhance the camouflage performance.

A nonwoven fabric as manufactured in Example 3, wherein the material has been overprinted with a North American green camouflage pattern. The completed camouflage material is shown in FIG. 5

Example 5

Figure 6:
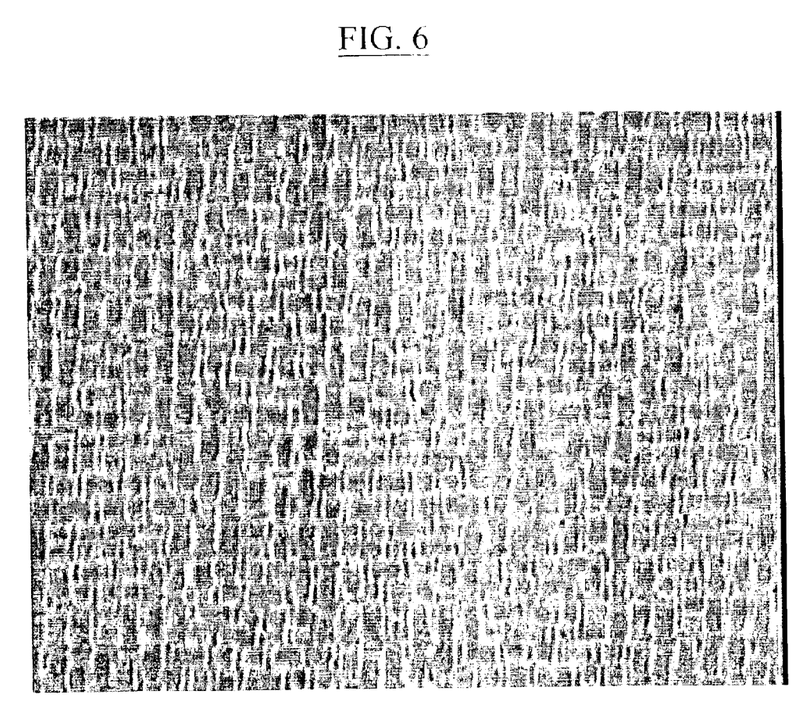
FIG. 6 is a photograph of an exemplary imaged nonwoven substrate having a "greenery" image.

A nonwoven fabric was manufactured as described in Example 1, whereby in the alternative a "greenery" pattern was used on the image transfer device 18, and depicted in the resulting fabric in FIG. 6

Example 6

Figure 7:
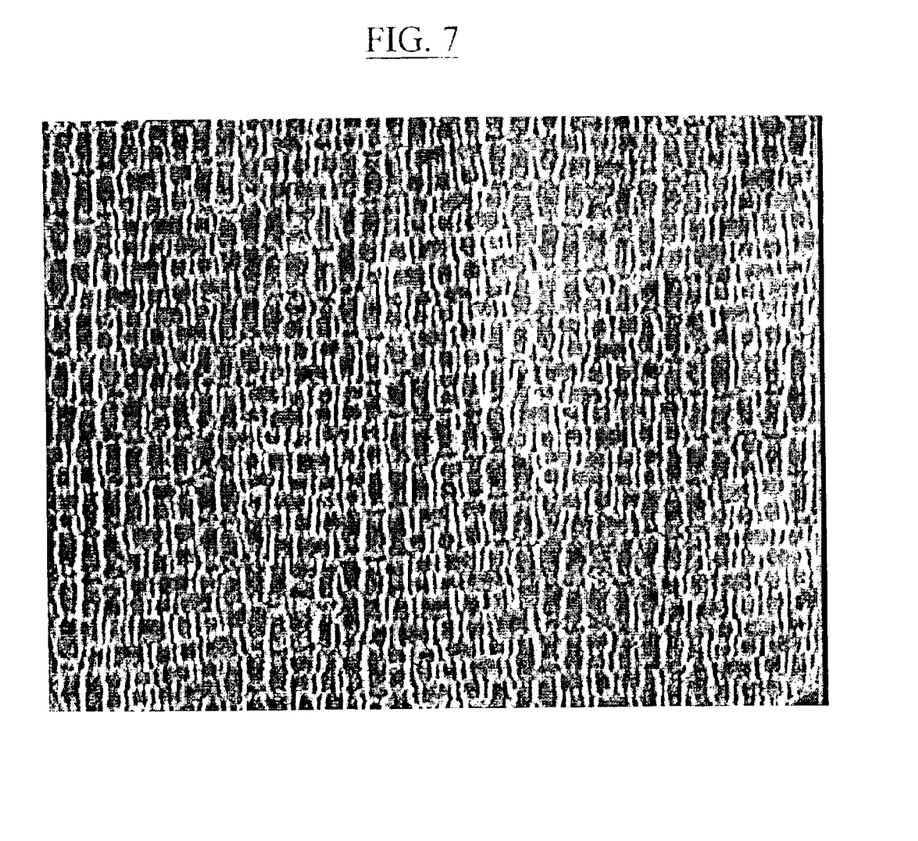
FIG. 7 is a photograph of an exemplary imaged nonwoven substrate having a "greenery" image and overprinted with a print pattern to enhance the camouflage performance.

A nonwoven fabric as manufactured in Example 5, wherein the material has been overprinted with a North American green camouflage pattern. The completed camouflage material is shown in FIG. 7

Figure 8:
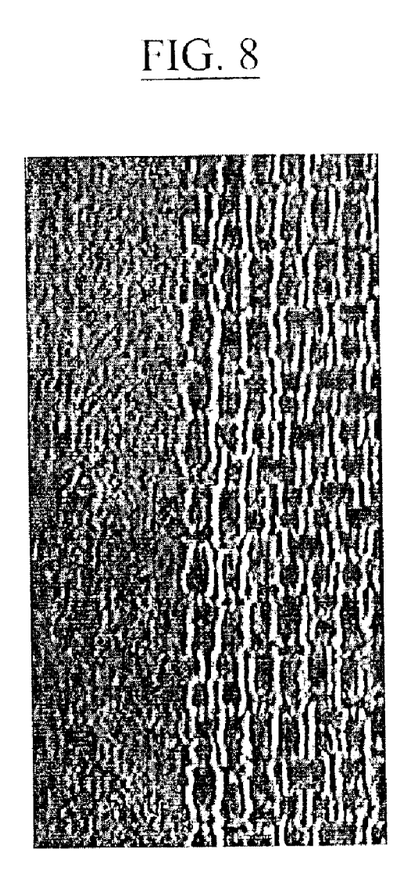
FIG. 8 is a photograph of an exemplary imaged nonwoven substrate having a "greenery" image region and a non-imaged region, both regions being overprinted with a print pattern to enhance the camouflage performance.

As can be seen in the aforementioned figures, the combination of a three-dimensional pattern with colored facing layers results in a material suitable for camouflage applications. This is particularly evident in FIG. 8, wherein the imaged and un-imaged surfaces are compared with an equivalent overprinting applied.

Camouflage material made in accordance with the present invention can be used either in rolled sheet form, or as a component fabric in such articles as garments, tents and equipment or structure covers. Such articles are typified in U.S. Pat. Nos. 4,656,065, 5,652,963, 5,652,963, 6,092,857, 6,256,922, and 6,257,263, incorporated herein by reference.

What is claimed is:

1. A method of making a camouflage non-woven material, comprising the steps of:

forming a non-woven layer having a predetermined pattern or image selected from the group consisting of: woodland and/or grassland patterns including tree bark, leaves, pine bough, tree limbs, flowers, grass blades, pine cones, palm fronds, and rocks; including providing a three-dimensional image transfer device exhibiting said predetermined pattern or image, and forming said nonwoven layer by hydroentanglement on said three-dimensional image transfer device, providing a colored layer having a different aesthetic quality than said predetermined pattern or image of said non-woven layer, applying said colored layer to said non-woven layer by a process selected from the group consisting of: dyeing, differential dyeing, transfer printing, digital printing, and overprinting;

the resulting camouflage material exhibiting improved pattern disruption of said predetermined pattern or image by said colored layer.

2. A method of making a non-woven camouflage material in accordance with claim 1, wherein: the non-woven layer is selected from the group consisting of carded fibrous batt, air-laid fiber web, spun-laid filament web, melt-blown filament web, consolidated non-woven fabric, and combinations thereof.

3. A method of making a non-woven camouflage material in accordance with claim 1, wherein the nonwoven layer is comprised of material selected from the group consisting of staple length natural fiber, staple length polymeric fiber, continuous polymeric filament, and mixtures thereof.

4. A method of making a non-woven camouflage material in accordance with claim 1, wherein the nonwoven layer is in the basis weight range of about 0.5 to 12.0 ounces per square yard.

5. A method of making a non-woven camouflage material in accordance with claim 1, wherein the colored layer is selected from the group consisting of variations in color, tint, hue, brightness, opacity, and combinations thereof.

* * * * *